United States Patent [19]

Marks et al.

[11] Patent Number: 6,077,919
[45] Date of Patent: *Jun. 20, 2000

[54] SILYL-TERMINATED POLYMER AND METHOD FOR PREPARING SILYL-TERMINATED POLYOLEFINS

[75] Inventors: Tobin J. Marks, Evanston; Kwangmo Koo, Wilmette, both of Ill.

[73] Assignee: Northwestern University, Evanston, Ill.

[*] Notice: This patent is subject to a terminal disclaimer.

[21] Appl. No.: 09/096,918

[22] Filed: Jun. 12, 1998

Related U.S. Application Data

[63] Continuation-in-part of application No. 08/874,188, Jun. 13, 1997.

[51] Int. Cl.[7] .................................................. C08F 2/38
[52] U.S. Cl. .................... 526/82; 526/83; 526/84; 526/127; 526/160; 502/102
[58] Field of Search .................. 526/82, 83, 84, 526/127, 160; 502/102

[56] References Cited

U.S. PATENT DOCUMENTS

| | | |
|---|---|---|
| 4,668,773 | 5/1987 | Marks et al. . |
| 4,801,666 | 1/1989 | Marks et al. . |
| 4,871,705 | 10/1989 | Hoel . |
| 5,001,205 | 3/1991 | Hoel . |
| 5,096,867 | 3/1992 | Canich ................................ 526/160 |
| 5,552,358 | 9/1996 | Speca ................................. 526/129 |
| 5,578,690 | 11/1996 | Marks et al. . |
| 5,672,669 | 9/1997 | Wasserman et al. ................ 526/170 |

OTHER PUBLICATIONS

Han et al. "Organometallics," vol. 5, 1986, pp. 1726–1733.

Mohring et al. "Journal of Organometallic Chemistry," vol. 479, 1994, pp. 1–29.

Marks et al. "Journal of the American Chemical Society," vol. 107, 1985, pp. 8091–8103.

*Primary Examiner*—David W. Wu
*Assistant Examiner*—Ling-Siu Choi
*Attorney, Agent, or Firm*—Welsh & Katz, Ltd.

[57] ABSTRACT

There is disclosed a method for synthesizing polyolefins having a silyl group at one terminus, the method comprising reacting a monomer of an a-olefin ($C \leq 3 \leq 10$) and a tetrasubstituted silyl radical in the presence of a metallocene catalyst.

3 Claims, No Drawings

SILYL-TERMINATED POLYMER AND METHOD FOR PREPARING SILYL-TERMINATED POLYOLEFINS

This application is a continuation-in-part of Ser. No. 08/874,188, Jun. 13, 1997.

This invention is made with government support under the National Science Foundation, Grant # CHE 910411. The government has certain rights in the invention.

FIELD OF THE INVENTION

The present invention relates to a method for the preparation of silyl-terminated polyolefins. More particularly, the invention relates to a method for synthesizing polyolefins having a silyl group at one terminus, said method comprising polymerizing α-olefins in the presence of a metallocene catalyst using a silane as a chain transfer agent. Copolymers can also be prepared using the method of this invention.

BACKGROUND OF THE INVENTION

Catalyst systems for the polymerization of olefins are well known in the art. Typically, these systems include a Ziegler-Nattatype polymerization catalyst; a co-catalyst, usually an organoaluminum compound; an electron donor compound (optional), and an olefin monomer. Control of molecular weight is important as it influences the final physical properties of the polymer. The molecular weight is controlled by chain transfer reactions which terminate the growth of the polymer chains. A number of such chain transfer processes, including β-H elimination, β-alkyl elimination and chain transfer to $MR_n$ (M=Zn, Al, etc.), monomer, and hydrogen have been identified. Of these, hydrogen has been found to be the most practical chain transfer agent since it is generally easy to use and normally does not affect the activity of the catalyst. However, there are many cases where even hydrogen does not provide the optimum results due to some undesired side effects (e.g., unresponsive M—R bonds, overactivation of the catalyst, too rapid hydrogenation of other functional groups). Therefore, alternative chain transfer agents for use in the production of polyolefin homopolymers and copolymers are highly desirable.

Terminally functionalized polymers are of great current interest. Such a polymer could be used as precursor for making block or graft polymers and would be expected to exhibit modified chemical and physical properties.

It has previously been disclosed in U.S. Pat. No. 5,578, 690 that certain silanes can be used as chain transfer agents when ethylene, or a combination of ethylene and an α-olefin, is polymerized with certain metallocene catalysts. There the method resulted in an ethylene polymer, or co-polymer of ethylene and an α-olefin, having a silyl group at one terminus of its chain. Unfortunately, this organolanthanide polymerization system is limited to ethylene polymerization and copolymerization and cannot be expanded to homopolymers of higher α-olefins.

SUMMARY OF THE INVENTION

Accordingly, it is an object of the subject invention to prepare and utilize a new class of olefin polymerization catalysts.

A further object of the subject invention is a catalyst which permits better control over molecular weight and molecular weight distribution of such polymers of higher α-olefins.

Another object of the subject invention is a Ziegler-Nattatype catalyst system which reduces the use of excess co-catalyst.

These and other objects are attained in the subject invention whereby in one embodiment there is a method to produce silyl-capped polyolefins and the silyl-capped polyolefins thereby prepared. This method includes polymerization of α-olefins with silanes as chain transfer reagents using group 4 Ziegler-Natta homogeneous catalysts. The method involves reacting α-olefins ($C \geq 3$), catalyzed by group 4 metal catalysts in hydrocarbon solvents in the presence of a silane having the formula $R(Si^2R^3R^4)_n$, wherein R is H, a hydrocarbon ($1 \leq C \leq 10$) or silyl group each having a valence equal to n and, at least, one of $R^2$, $R^3$ and $R^4$ is H and the other of $R^2$, $R^3$ and $R^4$ may be a monovalent group independently selected from the group consisting of: hydrogen, alkyl radicals, aryl radicals, alkylaryl radicals, arylalkyl radicals, alkoxy radicals ($1 \leq C \leq 20$); aryloxy radicals, fluorinated alkyl radicals ($3 \leq C \leq 6$), a dialkylamino group in which the alkyl groups contain 1 to 4 carbon atoms, a diorganopolysiloxane chain containing 1 to 10 siloxane units and n=1–6 and when R is H, n is 1.

DETAILED DESCRIPTION OF THE INVENTION

The primary component of the present invention is selected from an α-olefin ($C \geq 3$) or a combination of two or more such α-olefins. Specific examples of suitable α-olefins include styrene, propene, 1-butene, 1-pentene, 1-hexene, and 1-octene.

Another component of the instant method is a silane having the formula

$$R-(SiR^2R^3R^4) \qquad (i)$$

wherein R is H, an aliphatic or aromatic hydrocarbon, or silyl group each having a valence equal to n and at least one of $R^2$, $R^3$, and $R^4$ is H, and the other of $R^2$, $R^3$ and $R^4$ is a monovalent group independently selected from the group consisting of: hydrogen, hydroxyl radicals, alkyl radicals, aryl radicals, alkylaryl radicals, arylalkyl radicals, alkoxy radicals ($1 \leq C \leq 20$); phenoxy radicals, fluorinated alkyl radicals ($3 \leq C \leq 6$), a dialkylamino group in which the alkyl groups contain 1 to 4 carbon atoms, a diorganopolysiloxane chain containing 1 to 10 siloxane units and n=1–6 and when R is H, n is 1. In addition, either R, and/or $R^2$, $R^3$, or $R^4$ can be a polymeric subsituent. By "polymeric substituent" it is meant an organic or Si-containing polymer. For example, the polymeric substituent could be a polymer or copolymer of α-olefins such as styrene, propene, 1-butene, 1-pentene, 1-hexene, and 1-octene, the resuting reaction product thus essentially forming a block copolymer.

In another embodiment, a block copolymer could be formed using a silane which is a silyl-terminated polymer made by the process described as this invention, the silane being made either separately or in situ with the block copolymer.

More specifically, R, $R^2$, $R^3$ and $R^4$ each may represent a monovalent group independently selected from hydrogen, halogen, hydroxyl radicals, alkyl radicals having 1 to 20 carbon atoms, aryl radicals such as phenyl and tolyl, alkylaryl radicals such as ethylphenyl and ethyltolyl, arylalkyl radicals such as phenylethyl and benzyl, alkoxy or amide radicals having 1 to 20 carbon atoms, phenoxy radicals, fluorinated alkyl radicals having 3 to 6 carbon atoms such as 3,3,3-trifluoropropyl, a dialkylamino group in which the alkyl groups contain 1 to 20 carbon atoms and a diorganopolysiloxane chain containing 1 to about 10 siloxane units in which the organic groups are independently selected from alkyl radicals having 1 to 6 carbon atoms, aryl radicals, fluorinated alkyl radicals, silyl groups or alkoxy radicals having 1 to 4 carbon atoms.

Preferred groups which are bonded to the silicon atom of the above formula (i) include hydrogen, methyl, ethyl, isopropyl, isobutyl, phenyl, methoxy, ethoxy, chlorine, 3,3, 3-trifluoropropyl, dimethylamino and siloxane groups of the formula $$R'_3SiO(SiR'_2O)_j— \qquad (ii)$$

in which R' is independently selected from methyl, hydroxyl, phenyl, 3,3,3-trifluoropropyl, methoxy or ethoxy groups and j has a value of 0 to 10. Highly preferred silanes, according to the instant method, are phenylsilane, diphenylsilane, phenylmethylsilane, pentamethyldisiloxane, methylsilane, and dimethylsilane.

The catalyst is selected from a metallocene catalyst or a metallocene catalyst in combination with a co-catalyst. The metallocene catalyst of the invention has a general composition of $Cp_mMX_nY_p$ or $CpMX_d$ and a co-catalyst, where the catalyst is typically a constrained geometry catalyst:

(iii)

wherein Cp denotes a cyclopentadienyl, a substituted cyclopentadienyl radical, or a fused cyclopentadienyl radical, such as an indenyl radical.

Examples of substituted Cp groups include $C_5R^*_4$, in which R* is selected from the group consisting of hydrogen, alkyl having 1 to 20 carbon atoms, aryl having 6 to 18 carbon atoms and triorganosilyl, such as trimethylsilyl. A specific Cp group includes tetramethylcyclopentadienyl (Cp'=$\eta^5$-$C_5Me_4$), or pentamethylcyclopentadienyl(Cp"=$\eta^5$-$C_5Me_5$) wherein Me hereinafter denotes a methyl radical and $\eta^5$ indicates pentahapto coordination to the metal.

Further:

M is a metal of group 3, 4, 5, 6, 7, 8, 9, 10 or an element of the actinide or lanthanide groups, and preferably Ti, Zr, or Hf;

X is an inert anionic ligand (C≦20);

Y is a heteroatom ligand, such as —OR—, —SR—, —NR*—, —PR*— or a neutral two-electron donor ligand selected from the group consisting of —CR, —SR, —NR*$_2$ or —PR*$_2$;

Z is $SiR^*_2$, $CR^*_2$, $SiR_2SiR^*_2SiR^*_2$, $CR^*_2CR^*_2$, $CR^*=CR^*$, $CR^*_2SiR^*_2$, $GeR^*_2$, $SnR^*_2$, wherein:

R*, each occurrence, is independently selected from the group consisting of hydrogen, alkyl, aryl, silyl, alkoxy, aryloxy, halogenated alkyl, halogenated aryl groups, and mixtures thereof, wherein said alkyl, aryl, silyl, alkoxy, aryloxy, halogenated alkyl, halogenated aryl groups have up to 20 carbon or non-hydrogen atoms, or two or more R groups from Y, Z or both Y and Z form a fused ring system;

m, n and p are independent;

p is 0, 1 or 2;

m is 0, 1, 2 or 3; n is 1, 2, 3 or 4;

the sum of m and n is equal to the valence of M when p=0;

d is 1 to 4.

The co-catalyst may be any of the compatible, noncoordinating or weakly coordinating anions (preferably BR$^-_4$), organo-Lewis acids, preferably BR*$_3$, methylalumoxane (MAO), alkyl-modified methylalumoxane (MMAO) and $AlX_qR^*_{3-q}$, etc., wherein R* independently is alkyl or aryl or substituted aryl, preferably fluoroaryl, X is a halogen, 0≦q≦3.

It should be noted that whereas formula iii and the following formulas indicate a cyclic structure for the catalysts, when Y is a neutral two electron donor ligand, the bond between M and Y is more accurately referred to as a coordinate-covalent bond. Also, it should be noted that the complex may exist as a dimer or higher oligomer.

Specific examples of the above metallocene catalysts include compounds having the following formulas, in which Me, Cp' and Cp" have their previously defined meanings:

$Me_2SiCp'(t-BuN)TiMe_2$ Cp"ZrMe$_3$ rac-$C_2H_5$(Indenyl)$_2TiMe_2$ $Me_2SiCp'(t-BuN)HfMe_2$ Cp"TiMe$_3$ Cp'=$\eta^5$-$C_5Me_4$ $Me_2SiCp'(t-BuN)ZrMe_2$ Cp"HfMe$_3$ Cp"=$\eta^5$-$C_5Me_5$ The above described catalysts are known in the art and they may be employed in particulate form, as a homogeneous solution or supported on inert materials such as alumina, methylalumoxane-activated silica, silica, silica-alumina and magnesium chloride, inter alia. They may be prepared by e.g., methods taught by Den Haan et al. in *Organometallics*, vol.5, 1726–33, 1986; Möhring et al. in *Journal of Organometallic Chemistry* vol. 479, 1–29,1994; U.S. Pat. Nos. 4,871,705 and 5,001,205 to Hoel; U.S. Pat. Nos. 4,801,666 and 4,668,773 to Marks and by Marks et al. in *Journal of the American Chemical Society*, vol. 107, 8091–8103, 1985.

For the purposes of the present invention, a co-catalyst is also added when m=1, p=0, and n=3 and when M=Ti, Zr, or Hf. This co-catalyst is used, for example, to activate the metallocene catalyst and may be selected from alkylalumoxanes, trialkyl boron compounds in which the alkyl radicals have 1 to 8 carbon atoms or triaryl boron compounds in which the aryl radicals have 6 to 8 carbon atoms or borate reagents such as R'$_3$NH$^+$BR$^-_4$ or Ph$_3$C$^+$BR$^-_4$ where R' is an alkyl, aryl group or perfluoroaryl group. A highly preferred co-catalyst is methylalumoxane (MAO) or alkyl-modified methylalumoxane (MMAO). Certain co-catalysts, such as MAO, also act as oxygen scavengers and desiccants and are beneficial for these functions as well. Alternatively, the co-catalyst can be a compound having the formula $AlG_kR^6_{(3-k)}$ in which G is selected from hydrogen, halogen, alkyl radicals having 1–8 carbon atoms or aryl radicals having 6 to 8 carbon atoms, R$^6$ is an alkyl radical having 1–8 carbon atoms and k is an integer having a value of 0 to 3.

Various metallocene catalysts which require a co-catalyst are described in above-cited U.S. Pat. Nos. 4,871,705 and 5,001,205 to Hoel, the disclosures of which are hereby incorporated by reference. Particularly, catalysts wherein X=halogen require a co-catalyst, MAO is preferably used in combination therewith.

Based on the instant disclosure and the patent as well as scientific literature, those skilled in the art will readily identify circumstances wherein a co-catalyst is desirable by routine experimentation (e.g., based on rate of reaction, polymer yield and molecular weight).

In a preferred embodiment of the instant method, the catalyst and silane are first mixed, preferably in a non-polar hydrocarbon solvent, such as toluene, butane, pentane, hexane, octane and iso-octane, for example. Preferably the solvent is toluene. Alternatively, the silane itself can act as a solvent if a low molecular weight polymer is desired. The above mixing operation must avoid the introduction of moisture or oxygen. The latter condition may be satisfied by running the reaction under an inert atmosphere, such as nitrogen or argon, as is standard in the art.

The α-olefin (or a mixture of an α-olefin and another different α-olefin) is introduced while the ingredients are vigorously agitated and the polymerization reaction is carried out at a temperature of about −100° C. to +200° C., preferably −20° C. to +150C. The pressure during polymerization is typically controlled at 1 to 100 atmospheres, preferably 1 to 5 atmospheres, and is determined by temperature in a closed system or by the pressure of the volatile components in a continuous polymerization. When a second α-olefin having a boiling point above the reaction conditions is used, it may be added simultaneously with the first α-olefin. When the silane is a gas under the reaction conditions, it may also be added simultaneously with the α-olefin in the desired ratio to produce the silyl-terminated polymer or co-polymer. Upon completion of the reaction, the silyl-terminated polymer sometimes precipitates out of solution when a solvent is used. The polymer can also be recovered by evaporating the solvent. If the reaction is to be carried out without the use of a solvent (e.g., in a gas phase reaction using a supported catalyst), the reaction temperature is preferably adjusted such that the silane and α-olefin are both gases. In this case, the mixture of α-olefin and silane is exposed to the catalyst and the polymer formed may be removed as a melt from the bottom of the reactor. The polymer or copolymer may be purified by re-precipitation or by some other conventional technique.

The above polymerization reaction may be summarized by the following generalized equation:

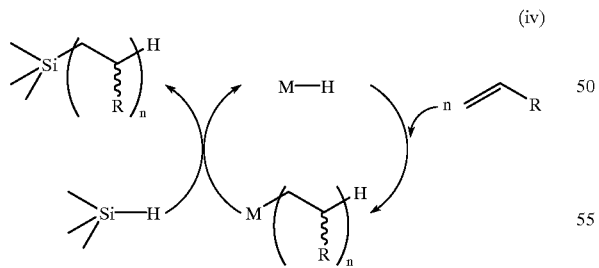

(iv)

wherein R has its previously defined meaning and n represents the average degree of polymerization. Although the inventors of the instant method do not wish to be bound by a particular mechanism or theory, it is believed that, at least for the lanthanide catalysts and titanium constrained geometry catalysts of the invention, the chain transfer step involves the transfer of the polyolefin to the silicon moiety and the molecular weight of resulting polymer is controlled by the concentration of silane chain transfer reagent and the simultaneous regeneration of active catalyst, which readily participates in the next catalytic cycle. This is best shown in Table 1.

TABLE I

Propylene and 1-Hexene Polymerization;
Ethylene 1-Hexene and Ethylene-Styrene Copolymerzation in the Presence of [$Me_2Si(Me_4C_5)(t-BuN)$][$TiMe^+B(C_6F_5)_4^-$ and $PhSiH_3$.

| Entry | Time/Temp. | monomer (1 atm) | comonomer (M) | $PhSiH_3$ (M) | Polymer yield | comonomer incorp (M %) | $M_n^b$ | $M_w^b$ |
|---|---|---|---|---|---|---|---|---|
| 1 | 3 min/25° C. | propylene | | 1.13 | 3.2 g | | 890 | 4,500 |
| 2 | 2 min/25° C. | propylene | | 0.73 | 3.8 g | | 1,100 | 4,800 |
| 3 | 3 min/25° C. | propylene | | 0.41 | 2.5 g | | 3,500 | 7,900 |
| 4 | 3 min/25° C. | propylene | | 0.24 | 3.0 g | | 3,800 | 9,400 |
| 5 | 3 min/25° C. | propylene | | 0.080 | 4.0 g | | 11,000 | 95,000 |
| 6 | 2 min/25° C. | propylene | | 0.030 | 3.0 g | | 43,000 | 150,000 |
| 7 | 10 min/0° C. | propylene | | 0.020 | 4.0 g | | 67,000 | 210,000 |
| 8 | 60 min/25° C. | 1-hexene$^c$ | | 0.030 | 3.1 g | | 2,500 | 6,200 |
| 9 | 180 min/25° C. | ethylene | 0.17$^d$ | 0.050 | 2.8 g | 50 | 72,000 | 100,000 |
| 10 | 180 min/25° C. | ethylene | 0.32$^e$ | 0.060 | 2.6 g | 52 | 50,000 | 120,000 |

$^a$Concentration range of catalyst = 2.64–3.05 mM
$^b$By GPC in 1,2,4-trichlorobenzenevs. polystyrene standards.
$^c$Concentration of 1-hexene = 6.00 M
$^d$Styrene
$^e$1-Hexene The method of the invention clearly demonstrates that a silane compound as disclosed can serve as an effective chain transfer agent in the polymerization of olefins using a metallocene-containing catalyst. Therefore, the molecular weight of the resulting polymer or copolymer can be controlled by adding the appropriate amount of the silane.

Furthermore, the instant method may be used to prepare novel silyl-terminated co-polymers wherein one terminus of the co-polymer is a silyl group preferably of the formula:

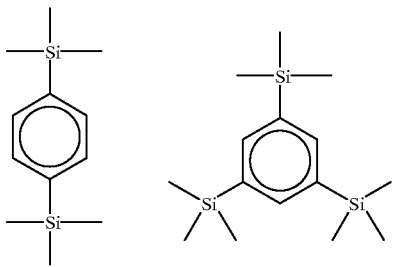

or $$R(SiR^2R^3R^4)_n$$

in which R, $R^2$, $R^3$, and $R^4$ are defined as above.

The silyl-terminated polymers or interpolymers produced according to the method of the present invention find utility in the preparation of block copolymers or star lock copolymers (e.g., when the silyl end group contains one or more reactive sites such as SiH) for application as polymer compatibilizers. They may also be used to modify the surface of plastics such as polyolefins for coating or adhesion purposes.

EXAMPLES

The following examples are presented to further illustrate the method of this invention, but are not to be construed as limiting the invention, which is delineated in the appended claims. All parts and percentages in the examples are on a weight basis and all measurements were obtained at 25° C.

unless indicated to the contrary. The notation Ph is used to denote phenyl radical.

Example 1

In the glove box, 10 mg (0.031 mmol) of [$Me_2Si(Me_4C_5)$(t-BuN)]$TiMe_2$ and 28 mg (0.030 mmol) of $Ph_3C^+B(C_6F_5)_4^-$ were loaded into a 100 mL round bottom flask. On the vacuum line, 50 mL of toluene was added to the flask via a syringe under an Ar counterflow. Next, 0.20 mL (2.0 mmol) of $PhSiH_3$ was vacuum transferred into the flask at −78° C. The mixture was then warmed to room temperature and exposed to propylene (1 atm) while rapidly stirring for 3 min. The reaction was next quenched by the addition of 2.0 mL of methanol. The polymer was collected by filtration and then extracted with n-pentane (50 mL). The polymer was isolated by evaporating the solvent and washing the product with methanol and acetone, followed by drying under vacuum. (Yield, 4.0 g; $M_n$=43,000, $M_w$=150,000 by GPC; $^1$H NMR (benzene-$d_6$, relative intensity); d 7.50 (Ph, 0.2), 7.20 (Ph, 0.2), 4.48 ($SiH_2$, 0.2), 1.74 (—CH—, 31),1.21 (—$CH_2$—, 63), 0.96 (—$CH_3$, 100), 0.78 (—$CH_2$—, 0.2). $^{13}$C NMR ($C_6D_6$, 75.5 MHz): d 136.2, 130.1, 129.8, 128.7, 47.4, 47.1, 46.7, 46.3, 45.9, 44.8, 32.3, 29.5, 27.8, 23.1, 21.3, 20.9, 20.6, 20.4, 20.0, 19.6, 14.5, 1.95.

Example 2

In the glove box, 10 mg (0.031 mmol) of [$Me_2Si(Me_4C_5)$(t-BuN)]$TiMe_2$ and 28 mg (0.030 mmol) of $Ph_3C^+B(C_6F_5)_4^-$ were loaded into a 100 mL round bottom flask. On the vacuum line, 10 mL of toluene was added to the flask via syringe under an Ar counterflow. After evacuation, 0.40 mL (3.0 mmol) of $PhSiH_3$ and 7.5 mL (0.060 mol) of 1-hexene were then vacuum transferred into the flask at −78° C. The mixture was then warmed to room temperature while rapidly stirring for 60 min. The reaction was then quenched by the addition of 2.0 mL of methanol. The polymer was isolated by evaporating the solvent and then washing the product with methanol and acetone, followed by drying under vacuum. (Yield, 3.1 g; $M_n$=2,500, $M_w$=6,200 by GPC; $^1$H NMR (benzene-$d_6$, relative intensity); d 7.50 (Ph, 0.2), 7.20 (Ph, 0.2), 4.48 ($SiH_2$, 0.2), 1.65 (—CH—, 9.6),1.46 (—$CH_2$—, 100), 1.13 (—$CH_3$, 39). $^{13}$C NMR ($C_6D_6$, 75.5 MHz): d 136.5, 136.2, 135.5, 129.6, 46.0, 45.6, 40.9, 35.7, 34.6, 32.9, 32.4, 29.2, 27.2, 25.1, 23.8, 23.4, 17.5, 16.9, 16.8, 14.5, 14.4, 10.4.

Example 3

In the glove box, 10 mg (0.031 mmol) of [$Me_2Si(Me_4C_5)$(t-BuN)]$TiMe_2$ and 28 mg (0.030 mmol) of $Ph_3C+B(C_6F_5)_4^-$ were loaded into a 100 mL round bottom flask. On the vacuum line, 10 mL of toluene was added to the flask via syringe under an Ar counterflow. Next, 0.70 mL (5.0 mmol) of $PhSiH_3$ and 2.0 mL (0.017 mol) of styrene were vacuum transferred into the flask at −78° C. The mixture was then warmed to room temperature and exposed to ethylene (1 atm) while rapidly stirring for 60 min. The reaction was quenched by the addition of 2.0 mL of methanol. The polymer was collected by filtration, and then washed with methanol and acetone, followed by drying under high vacuum. Yield, 2.78 g (50%). Polymer composition: atactic polystyrene having $PhSiH_2$ endcaps; $M_n$=72,000, $M_w$=100,000 by GPC. $^1$H NMR ($C_2D_2Cl_4$, 120° C.): d 7.70–6.95 (m, Ph), 4.35 (m, $SiH_2$), 2.80–2.30 (m, —CH(Ph)—), 1.70–1.40 (m, —$CH_2$CHPh—), 1.40– 0.90 (m, —$CH_2CH_2$—). $^{13}$C NMR ($C_2D_2Cl_4$, 75.5 MHz, 120° C.): d 146.3, 145.8, 129.0, 128.0, 127.8, 127.6, 125.5, 41.0, 36.8, 34.3, 31.8, 29.6, 29.4, 27.5, 25.3, 24.2, 22.5, 13.7.

Example 4

In the glove box, 10 mg (0.031 mmol) of [$Me_2Si(Me_4C_5)$(t-BuN)]$TiMe_2$ and 28 mg (0.030 mmol) of $Ph_3C^+B(C_6F_5)_4^-$ were loaded into a 100 mL round bottom flask. On the vacuum line, 10 mL of toluene was added to the flask via syringe under an Ar counterflow. After evacuation, 1.0 mL (6.0 mmol) of $PhSiH_3$ and 4.0 mL (0.032 mol) of 1-hexene were vacuum transferred into the flask at −78° C. The mixture was then warmed to room temperature and exposed to ethylene (1 atm) while rapidly stirring for 60 min. The reaction was then quenched by the addition of 2.0 mL of methanol. The polymer was collected by filtration and then washed with methanol and acetone, followed by drying under high vacuum. Yield, 2.56 g (52%), polymer composition: poly(1-hexene) having $PhSiH_2$ endcaps; $M_n$=50,000, $M_w$=120,000 by GPC. $^1$H NMR ($C_2D_2Cl_4$, 120° C.): d 7.50 (m, Ph), 7.20 (m, Ph), 4.49 (m, $SiH_2$), 1.18 (m, —CH—), 1.47 (m, —$CH_2CH_2$—). 1.03 (m, —$CH_3$). $^{13}$C NMR ($C_2D_2Cl_4$, 75.5 MHz, 120° C.): d 136.2, 131.2, 129.7, 126.9, 45.0, 40.9, 40.3, 39.4, 39.0, 37.9, 35.3, 34.8, 34.6, 34.3, 33.9, 32.9, 32.4, 31.9, 30.7, 30.2, 29.2, 27.1, 23.7, 23.1, 20.7, 15.6, 14.5.

Example 5

In the glove box, 10 mg (0.030 mmol) of rac-ethylene diindenyl titanium dimethyl and 24 mg (0.026 mmol) of $PhC^+B(C_6F_5)_4^-$ were loaded into a 100 mL round bottom flask. On the vacuum line, 10 mL of toluene was added to the flask via syringe under an Ar counterflow. After evacuation, 1.0 mL (6.0 mmol) of $PhSiH_3$ was vacuum transferred into the flask at −78° C. The mixture was then warmed to −45° C. and exposed to propylene (1 atm) while rapidly stirring for 10 min. The reaction was then quenched by the addition of 2.0 mL of methanol. The polymer was collected by filtration, and then washed with methanol, acetone and n-hexane, followed by drying under high vacuum. (Yield, 0.040 g). The isotacticity is >94% (based on $^{13}$C NMR assay of mmmm pentad composition). $M_n$=8,200 by NMR. $^1$H NMR ($C_2D_2Cl_4$, 120° C.): d 7.522 (m, Ph), 7.35 (m, Ph), 4.22 (m, $SiH_2$), 1.62 (m, (—CH—), 1.28 (m, (—$CH_2$—), 0.88 (m, —$CH_3$).

Example 6

In the glove box, 13 mg (0.057 mmol) of ($C_5Me_5$)$TiMe_3$ and 33 mg (0.036 mmol) of $Ph_3C^+B(C_6F_5)_4^-$ were loaded into a 100 mL round bottom flask. On the vacuum line, 10 mL of toluene was added to the flask via syringe under an Ar counterflow. The mixture was then warmed to 45° C. and 1.0 mL (6.0 mmol) of $PhSiH_3$ and 5 mL of styrene were injected via a syringe while stirring for 3 minutes. The reaction was then quenched by the addition of 2.0 mL of methanol. The polymer was collected by filtration, and then washed with methanol and acetone, followed by drying under high vacuum. (Yield, 4.48 g). The syndiotacticity is >98% (based on $^{13}$C NMR). $M_n$=52,000 by NMR. $^1$H NMR ($C_2D_2Cl_4$, 120° C.): d 7.40–6.60 (m, Ph), 7.35 (m, Ph), 4.21 (m, $SiH_2$), 1.85 (m, (—CH—), 1.35 (m, (—$CH_2$—). 0.90 (d, —$CH_3$).

Example 7

In the glove box, 10 mg (0.027 mmol) of [$Me_2Si(Me_4C_5)$(t-BuN)]$ZrMe_2$ and 28 mg (0.030 mmol) of $Ph_3C^+B(C_6F_5)_4^-$ are loaded into a 100 mL round bottom flask. On the vacuum line, 50 mL of toluene is added to the flask via a syringe under an Ar counterflow. Next, 0.20 mL (2.0 mmol) of $PhSiH_3$ is vacuum transferred into the flask at −78° C. The mixture is then warmed to room temperature and exposed to propylene (1 atm) while rapidly stirring for 3 min. The reaction is next quenched by the addition of 2.0 mL of methanol. The polymer is collected by filtration and then extracted with n-pentane (50 mL). The polymer is isolated by evaporating the solvent and washing the product with methanol and acetone, followed by drying under vacuum.

Example 8

In the glove box, 10 mg (0.022 mmol) of [Me$_2$Si(Me$_4$C$_5$)(t-BuN)]HfMe$_2$ and 28 mg (0.030 mmol) of Ph$_3$C$^+$B(C$_6$F$_5$)$_4^-$ are loaded into a 100 mL round bottom flask. On the vacuum line, 10 mL of toluene is added to the flask via syringe under an Ar counterflow. After evacuation, 0.40 mL (3.0 mmol) of PhSiH$_3$ and 7.5 mL (0.060 mol) of 1-hexene are then vacuum transferred into the flask at −78° C. The mixture is then warmed to room temperature while rapidly stirring for 60 min. The reaction is then quenched by the addition of 2.0 mL of methanol. The polymer is isolated by evaporating the solvent and then washing the product with methanol and acetone, followed by drying under vacuum.

Example 9

In the glove box, 10 mg (0.031 mmol) of [Me$_2$Si(Me$_4$C$_5$)(t-BuN)]TiMe$_2$ and 28 mg (0.030 mmol) of Ph$_3$C$^+$B(C$_6$F$_5$)$_4^-$ are loaded into a 100 mL round bottom flask. On the vacuum line, 50 mL of toluene is added to the flask via a syringe under an Ar counterflow. Next, 0.40 mL (2.6 mmol) of 1,4-disilybenzene is vacuum transferred into the flask at −78° C. The mixture is then warmed to room temperature and exposed to propylene (1 atm) while rapidly stirring for 5 min. The reaction is next quenched by the addition of 2.0 mL of methanol. The polymer is collected by filtration and then extracted with n-pentane (50 mL). The polymer is isolated by evaporating the solvent and washing the product with methanol and acetone, followed by drying under vacuum.

Example 10

In the glove box, 10 mg (0.031 mmol) of [Me$_2$Si(Me$_4$C$_5$)(t-BuN)]TiMe$_2$ and 28 mg (0.030 mmol) of Ph$_3$C$^+$B(C$_6$F$_5$)$_4^-$ are loaded into a 100mL round bottom flask. On the vacuum line, 50 mL of toluene is added to the flask via a syringe under an Ar counterflow. Next, 0.50 g (3.0 mmol) of 1,3,5-trisilybenzene is transferred by syringe into the flask at −78° C. The mixture is then warmed to room temperature and exposed to polypropylene (1 atm) while rapidly stirring for 5 min. The reaction is next quenched by the addition of 2.0 mL of methanol. The polymer is collected by filtration and then extracted with n-pentane (50 mL). The polymer is isolated by evaporating the solvent.

Example 11

On the high vacuum line, toluene (20 mL) was condensed into a flamed, 100 mL reaction flask equipped with a magnetic stirring bar and a septum-covered sidearm. Next, 1.50 mL (10.92 mmol) of PhMeSiH$_2$ was vacuum transferred into the flask at −78° C. The mixture was then warmed to room temperature and exposed to propylene (1 atm) from the vacuum line while rapidly stirring. In the glove box, a 6 mL sample vial equipped with a septum cap was loaded with 10 mg (0.031 mmol) of [Me$_2$Si(Mc$_4$C$_5$)(t-BuN)]TiMe$_2$ and 28 mg (0.030 mmol) of Ph$_3$C$^+$B(C$_6$F$_5$)$_4^-$. A measured amount of toluene (2.0 mL) was then syringed into the vial containing the above reagents with a dry, Ar-purged gas-tight syringe. The vial was removed from the glove box immediately prior to the polymerization experiment. The catalyst solution was then quickly syringed under a propylene counterflow into the rapidly stirred olefin+silane reaction mixture through the septum-sealed reaction flask sidearm at 25° C. After a measured time interval (2 h), the reaction was quenched by the addition of 2.0 mL of methanol. The polymeric product was collected by filtration, and then extracted with n-pentane (50 mL). The polymer was isolated by evaporating the solvent and washing the product with methanol and acetone, followed by drying under vacuum. Yield, 2.7 g; M$_n$=19,000 by $^1$H NMR; $^1$H NMR (C$_6$D$_6$, relative intensity): δ7.48 (Ph, 0.14), 7.09 (Ph, 0.14), 4.60 (SiH, 0.07),1.74 (—CH—, 32), 1.21 (CH$_2$—, 68), 0.96 (—CH$_3$, 100), 0.78 (—CH$_2$—, 0.14), 0.44 (CH$_3$Si, 0.27), $^{29}$SiNMR (C$_6$D$_6$ 79.5 MHz); δ-2.0.

Example 12

Same procedure as for the above example 11 was used except at different reaction temperature (−15° C.) and reaction time (12 min). Yield, 2.08 g; M$_n$=25,000 (by $^1$H NMR).

Example 13

On the high vacuum line, toluene (50 mL) was condensed into a flamed, 100 mL reaction flask equipped with a magnetic stirring bar and a septum-covered sidearm. Next, 1.0 mL (7.28 mmol) of PhMeSiH$_2$ and 1.5 mL of styrene were vacuum transferred into the flask at −78° C. In the glove box, a 6 mL sample vial equipped with a septum cap was loaded with 10 mg (0.044 mmol) of (Me$_5$C$_5$)TiMe$_3$ and 28 mg (0.030 mmol) of Ph$_3$C$^+$B(C$_6$F$_5$)$_4^-$. A measured amount of toluene (2.0 mL) was then syringed into the vial containing the above reagents with a dry, Ar-purged gas tight syringe. The vial was removed from the glove box immediately prior to the polymerization. The catalyst solution was then quickly syringed under an Ar counterflow into the rapidly stirred olefin+silane reaction mixture at 120° C. through the septum-sealed reaction flask sidearm. After a measured time interval (12 h), the reaction was quenched by the addition of 2.0 mL of methanol. The polymeric product was collected by filtration, and then washed with methanol and acetone, followed by drying under vacuum. Yield, 0.86 g; M$_n$=47,000 by $^1$H NMR: $^1$H NMR (relative intensity, C$_2$D$_2$Cl$_4$): δ7.40–6.60 (100, Ph), 6.35 (66, Ph), 1.85 (33, —CH—), 1.35 (66, —CH$_2$—), 0.90 (0.39, —CH$_3$), 0.82 (0.24, CH$_3$Si) IR (KBr): ν$_{Si—H}$=2115 cm$^{-1}$.

Example 14

In the glove box, 15 mg (0.066 mmol) of (Me$_5$C$_5$)TiMe$_3$ and 40 mg (0.043 mmol) of Ph$_3$C$^+$B(C$_6$F$_5$)$_4^-$ were loaded into a 100 mL round bottom flask. On the vacuum line, 30 mL of toluene was condensed to the flask. Next, 1.30 mL (14.69 mmol) of Me$_2$SiH$_2$ was vacuum transferred into the flask at −78° C., and 1 atm of propylene was introduced into the reaction flask while rapidly stirring the solution at −30° C. After a measured time interval (60 min), the reaction was then quenched by the addition of 2.0 mL of methanol. The polymeric product was collected by filtration, and then extracted with n-hexene (50 mL). The polymer was isolated by evaporating the solvent and then washing the product with methanol and acetone, followed by drying under vacuum. Yield, 1.6 g: M$_n$=7,300 by $^1$H NMR; $^1$H NMR (C$_6$D$_6$, relative intensity); δ 4.32 (SiH, 0.2), 3.98 (SiH, 0.2), 1.76 (—CH—, 31), 1.19 (—CH$_2$—, 60), 0.97 (—CH$_3$, 100), 0.15 (CH$_3$Si, 0.90), 0.05 (CH$_3$Si, 0.87). $^{13}$C NMR (C$_6$D$_6$, 75.5 MHz): δ 46.73, 45.99, 42.92, 35.53, 34.32, 27.80, 20.93, 20.62, 20.11, 19.92, 17.25, 15.06, 12.15, 11.83, 11.52, 5.23. $^{29}$Si NMR (C$_6$D$_6$, 79.5 MHz): δ5.4, 4.7.

Example 15

In the glove box, 12 mg (0.053 mmol) of (Me$_5$C$_5$)TiMc$_3$ and 38 mg (0.041 mmol) of Ph$_3$C$^+$B(C$_6$F$_5$)$_4^-$ were loaded into a 100 mL round bottom flask. On the vacuum line, 20 mL of toluene was condensed to the flask. Next, 1.0 mL of styrene was injected by syringe into the reaction flask. After evacuation, 3.0 mL (33.9 mmol) of Me$_2$SiH$_2$ was vacuum transferred into the rapidly stirred reaction mixture at −78° C. The reaction mixture was rapidly warmed to 55° C. with oil bath. After a measured time interval (3 h), the reaction was then quenched by the addition of 2.0 mL of methanol. The polymeric product was collected by filtration, washed with methanol and acetone, followed by drying under high vacuum. Yield, 0.7 g; $M_n$=45,000 by $^1$H NMR; $^1$H NMR (relative intensity, $C_2D_2Cl_4$): δ7.40–6.80 (100, Ph), 6.35 (66, Ph), 4.24 (0.07, SiH), 1.85 (31, —CH—), 1.35 (65,—CH$_2$—), 0.90 (0.26, —CH$_3$), 0.52 (0.49, CH$_3$Si). $^{13}$C NMR ($C_6D_6$, 75.5 MHz): δ 145.2, 127.8, 127.6, 125.6, 43.5, 40.4, 33.3, 23.8, 22.6, 15.2, 14.2.

Example 16

In the glove box, 13 mg (0.057 mmol) of $(Me_5C_5)TiMe_3$ and 30 mg (0.033 mmol) of $Ph_3C^+B(C_6F_5)_4^-$ were loaded into a 100 mL round bottom flask. On the vacuum line, 20 mL of toluene was condensed into the flask. Next, 6.0 mL of 1-hexene was injected by syringe into the reaction flask. After evacuation, 2.0 mL (22.6 mmol) of $Me_2SiH_2$ was then vacuum transferred into the rapidly stirred reaction mixture al –78° C. The reaction mixture was allowed to warm to 25° C. After a measured time interval (16 h), the reaction was then quenched by the addition of 2.0 mL of methanol. The polymeric product was collected by filtration, washed with methanol and acetone, followed by drying under vacuum. Yield, 2.1 g. The product was a mixture of uncapped- and silylcapped-poly(1-hexene) and the ratio was 1:1. $^1$H NMR ($C_6D_5$): δ 4.05 (SiH).

Example 17

On the high vacuum line, toluene (50 mL) was condensed into a flamed, 100 mL, reaction flask equipped with a magnetic stirring bar and a septum-covered sidearm. Next, 3.0 mL (23.12 mmol) of $Et_2SiH_2$ and 1.0 mL of styrene were vacuum transferred into the flask at –78° C. In the glove box, a 6 mL sample vial equipped with a septum cap was loaded with 12 mg (0.053 mmol) of $(Me_5C_5)TiMe_3$ and 30 mg (0.033 mmol) of $Ph_3C^+B(C_6F_5)_4^-$. A measured amount of toluene (2.0 mL) was then syringed into the vial containing the above reagents with a dry, Ar-purged gas-tight syringe. The vial was removed from the glove box immediately prior to the polymerization experiment. The catalyst solution was then quickly syringed under an Ar counterflow into the rapidly stirred olefin+silane reaction mixture at 55° C. through the septum-sealed reaction flask sidearm. After a measured time interval (3 min), the reaction was next quenched by the addition of 2.0 mL of methanol. The polymeric product was collected by filtration, and then washed with methanol and acetone, followed by drying under vacuum. Yield, 0.68 g; $M_n$=43,000 by $^1$H NMR; $^1$H NMR (relative intensity, $C_2D_2Cl_4$): δ 7.07 (100, Ph), 6.56 (66, Ph), 3.42(0.07, SiH), 1.82 (31, —CH—), 1.28 (64, —CH$_2$—), 0.90 (0.24, —CH$_3$), 0.78 (0.22, CH$_3$Si), $^{13}$C NMR ($C_2D_2Cl_4$, 75.5 MHz): δ 145.1, 128.8, 127.7, 43.5, 40.4, 35.2, 20.0, 19.8, 1.2.

Example 18

On the high vacuum line, toluene (50 mL) was condensed into a flamed 250 mL reaction flask equipped with a magnetic stirring bar and a septum-covered sidearm. Next, 3.5 mL (27.0 mmol) of $Et_2SiH_2$ was vacuum transferred into the flask at –78° C. The mixture then warmed to room temperature and exposed to propylene (1 atm) while rapidly stirring. In the glove box, a 6 mL sample vial equipped with a septum cap was loaded with 14 mg (0.043 mmol) of $[Me_2Si(Me_4C_5)(t-BuN)]TiMe_2$ and 30 mg (0.033 mmol) of $Ph_3C^+B(C_6F_5)_4^-$. A measured amount of toluene (2.0 mL) was then syringed into the vial containing the above solutions with a dry, Ar-purged gas-tight syringe. The vial was removed from the glove box immediately prior to the polymerization experiment. The catalyst solution was then quickly syringed under a propylene counterflow into the rapidly stirred olefin+silane reaction mixture at room temperature through the septum-sealed reaction flask sidearm. After a measured time interval (5 h), the reaction was next quenched by the addition of 2.0 mL of methanol. The polymer was collected by filtration, and then extracted with n-pentane (50 mL). The polymer was isolated by evaporating the solvent and washing the product with methanol and acetone, followed by drying under vacuum. Yield, 2.94 g; 60% of silyl-terminated polypropylene was obtained. $^1$H NMR ($C_6D_6$): δ 4.20 (SiH).

Example 19

On the high vacuum line, toluene (50 mL) was condensed into a flamed 100 mL reaction flask equipped with a magnetic stirring bar and a septum-covered sidearm. Next, 3.0 mL (23.1 mmol) of $Et_2SiH_2$ was vacuum transferred into the flask at –78° C. The mixture then warmed to room temperature and exposed to propylene (1 atm) while rapidly stirring. In the glove box, a 6 mL sample vial equipped with a septum cap was loaded with 12 mg (0.053 mmol) of $(Me_5C_5)TiMe_3$ and 30 mg (0.033 mmol) of $Ph_3C^+B(C_6F_5)_4^-$. A measured amount of toluene (2.0 mL) was then syringed into the vial containing the above reagents with a dry, Ar-purged gas-tight syringe. The vial was removed from the glove box immediately prior to the polymerization experiment. The catalyst solution was then quickly syringed under a propylene counterflow into the rapidly stirred olefin+silane reaction mixture at room temperature through the septum-sealed reaction flask sidearm. After a measured time interval (12 h), the reaction was quenched by the addition of 2.0 mL of methanol. The polymeric product was collected by filtration, and then extracted with n-pentane (50 mL). The polymer was isolated by evaporating the solvent and washing the product with methanol and acetone, followed by drying under vacuum. Yield, 4.03 g. End groups were not observed due to the high molecular weight of the polymer. $^1$H NMR ($C_6D_6$, 300 MHz): δ 1.76 (—CH—, 31) 1.19 (—CH$_2$—, 60), 0.97(—CH$_3$, 100).

Example 20

On the high vacuum line, 1.0 g of $PhH_2Si$-capped polypropylene was placed in a flamed, 100 mL reaction flask equipped with a magnetic stirring bar and septum-covered sidearm under an Ar counterflow. Then, 60 mL of toluene was condensed into a flask to dissolve the polymer. Next 3.0 mL of styrene were vacuum transferred into the flask at 78° C. In the glove box, a 6 mL sample vial equipped with a septum cap was loaded with 15 mg (0.066 mmol) of $(Me_5C_5)TiMe_3$ and 40 mg (0.043 mmol) of $Ph_3C^+B(C_6F_5)_4^-$. A measured amount of toluene (2.0 mL) was then syringed into the vial containing the above reagents with a dry, Ar-purged gas-tight syringe. The vial was removed from the glove box immediately prior to the polymerization experiment. The catalyst solution was then syringed under an Ar counterflow into the rapidly stirred reaction mixture through the septum-sealed reaction flask sidearm at 120° C. After a measured time interval (24 h), the reaction was quenched by the addition of 2.0 ml of methanol. The polymeric product was collected by filtration, and then refluxed with n-heptane to remove any polypropylene. The polymer was then collected by filtration and washed with methanol and acetone, followed by drying under vacuum. Yield, 1.59 g; $^1$H NMR (relative intensity, $C_2D_2Cl_4$); δ 7.40–6.80 (100, Ph), 6.35 (66, Ph), 1.85 (21, —CH—), 1.35 (40, —CH$_2$—), 0.90 (4.33, —CH$_3$), $^{13}$C NMR ($C_2D_2Cl_4$, 75.5 MHz): δ 145.2, 127.8, 127.6, 125.5, 43.6, 40.5, 35.3, 27.3, 20.4, 20.1, 19.8, 1.2. $^{29}$Si NMR ($C_2D_2Cl_4$, 79.5 MHz); δ –3.42. $T_m$=272° C.

Example 21

On the high vacuum line, toluene (20 mL) was condensed into a flamed, 100 mL reaction flask equipped with a magnetic stirring bar and a septum-covered sidearm. Next, 1.0 mL (6.0 mmol) of PhSiH$_3$ was vacuum transferred into the flask at −78° C. The mixture then warmed to room temperature and exposed to propylene (1 atm) while rapidly stirring. In the glove box, a 6 mL sample vial equipped with a septum cap was loaded with 11 mg (0.031 mmol) of [Me$_2$Si(Me$_4$C$_5$)(t-BuN)]TiMe$_2$ and 28 mg (0.030 mmol) of Ph$_3$C$^+$B(C$_6$F$_5$)$_4$$^-$. A measured amount of toluene (2.0 mL) was then quickly syringed into the vial containing the above reagents with a dry, Ar-purged gas-tight syringe. The vial was removed from the glove box immediately prior to the polymerization experiment. The catalyst solution was then syringed under a propylene counterflow into the rapidly stirred reaction mixture through the septum-sealed reaction flask sidearm at room temperature. After a measured time interval (5 min), the flask was evacuated, and then 3.0 mL of styrene was injected into reaction flask by a syringe under an Ar counterflow. In the glove box, another 6.0 mL sample vial equipped with a septum cap was loaded with 11 mg (0.048 mmol) of (Me$_5$C$_5$)TiMe$_3$ and 30 mg (0.033 mmol) of Ph$_3$C$^+$B(C$_6$F$_5$)$_4$$^-$. A measured amount of toluene (2.0 mL) was then syringed into the vial containing the above reagents with a dry, Ar-purged gas-tight syringe. The catalyst solution was then quickly syringed under an Ar counterflow into the rapidly stirred reaction mixture through the septum-sealed reaction flask sidearm at 110° C. After 16 h stirring, the reaction was quenched by the addition of 2.0 mL of methanol. The polymeric product was collected by filtration, and then refluxed with n-heptane to remove polypropylene. The polymer was collected by filtration, and then washed with methanol and acetone, followed by drying under vacuum. Yield, 2.50 g. The product was a mixture of highly syndiotactic (>97%) PhH$_2$Si-capped polystyrene, polypropylene-(Ph)(H)Si-polytyrene block copolymer, and uncapped polystyrene. $^1$H NMR (C$_2$D$_2$Cl$_4$): δ 4.21 (SiH, PhH$_2$Si-capped polystyrene). The Si—H peak of polypropylene-(Ph)(H)Si-polystyrene was not observed due to high molecular weight of the polymer.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed is:

1. A homopolymer consisting essentially of a monomer (3≦C≦10), wherein a terminus of said polymer is a silyl group of the formula R(SiR$^2$R$^3$R$^4$)$_n$, wherein R is H, a hydrocarbon, or a polymeric substituent, each having a valence equal to n and at least one of R$^2$, R$^3$, and R$^4$ is H, and the other of R$^2$, R$^3$, and R$^4$ is a monovalent group independently selected from the group consisting of:

hydrogen, hydroxyl radicals, alkyl radicals, aryl radicals, alkylaryl radicals, arylalkyl radicals, alkoxy radicals (1≦C≦20);

phenoxy radical, fluorinated alkyl radicals (3≦C≦6), dialkylamino group in which the alkyl groups contain 1 to 4 carbon atoms, a polymeric substituent, a diorganopolysiloxane chain containing 1 to 10 siloxane units and n=1–6 and when R is H, n is 1.

2. The polymer according to claim 1, wherein said monomer is selected from the group consisting of styrene, propene, and 1-hexene.

3. The polymer according to claim 1, wherein R$^2$, R$^3$ and R$^4$ are independently selected from the group consisting of hydrogen, hydroxyl, methyl, and phenyl.

* * * * *